United States Patent
Pisano et al.

(10) Patent No.: US 7,175,423 B1
(45) Date of Patent: Feb. 13, 2007

(54) AIR STAGED LOW-NOX BURNER

(75) Inventors: Stephen P. Pisano, Cranberry Township, Butler County, PA (US); Anthony G. Fennell, Macedonia, OH (US); John R. Hemmerlin, Grove City, PA (US); Glenn W. Baggley, Pittsburgh, PA (US); John C. Dormire, Harrison City, PA (US)

(73) Assignee: Bloom Engineering Company, Inc., Pittsburgh, PA (US)

( * ) Notice: Subject to any disclaimer, the term of this patent is extended or adjusted under 35 U.S.C. 154(b) by 152 days.

(21) Appl. No.: 10/111,637

(22) PCT Filed: Oct. 26, 2000

(86) PCT No.: PCT/US00/41596

§ 371 (c)(1),
(2), (4) Date: Aug. 5, 2002

(87) PCT Pub. No.: WO01/35022

PCT Pub. Date: May 17, 2001

(51) Int. Cl.
F23D 14/22 (2006.01)
F23C 99/00 (2006.01)
F23C 7/00 (2006.01)
F23C 7/02 (2006.01)

(52) U.S. Cl. .............. 431/10; 431/9; 431/159; 431/181; 431/187; 431/348; 431/350

(58) Field of Classification Search ........... 431/167, 431/5, 7, 9, 10, 159, 350, 351, 187, 348, 431/182, 181, 166, 164, 115

See application file for complete search history.

(56) References Cited

U.S. PATENT DOCUMENTS 2,250,680 A 7/1941 Schlitt (Continued)

FOREIGN PATENT DOCUMENTS

DE 4001378 * 7/1991

(Continued)

OTHER PUBLICATIONS

Tomio Suzuki et al., "Low-Nox Combustion under High Preheated Air Temperature Condition in an Industrial Furnace", Japanese Flame Research Committee, 1996 (pp. 1-18).

(Continued)

Primary Examiner—Carl D. Price
(74) Attorney, Agent, or Firm—The Webb Law Firm (57) ABSTRACT

An apparatus and method for using staged air combustion. The apparatus includes a burner body (10) secured to a port block (42), and a fuel passageway (12) extending through the burner body (10), terminating in a fuel nozzle (22), which injects fuel into the burner throat (40). Primary air jets (20) are configured to inject primary air into a primary combustion region (24), which is normally in the burner throat (40). A dish with a dish surface (28) is connected to the burner throat (40); the dish surface (28) extending in a divergent angle with respect to a burner centerline (35). Secondary air jets (34) are connected to the air passageway (14) and extend through the port block (42). The secondary air jets (34) inject secondary air into a secondary combustion region (38), which may be at the dish surface (28) or the hot face (30) of the burner.

8 Claims, 6 Drawing Sheets

U.S. PATENT DOCUMENTS

| | | | |
|---|---|---|---|
| 2,398,611 A | | 4/1946 | Beggs |
| 3,267,984 A | * | 8/1966 | Reed et al. .................. 431/185 |
| 3,418,062 A | * | 12/1968 | Hovis et al. ................ 431/350 |
| 3,424,542 A | * | 1/1969 | Moore et al. ............... 431/348 |
| 3,758,263 A | * | 9/1973 | Kissel ........................ 431/158 |
| 3,836,315 A | * | 9/1974 | Shular ............................ 431/9 |
| 3,876,362 A | | 4/1975 | Hirose |
| 4,004,875 A | | 1/1977 | Zink et al. |
| 4,220,444 A | * | 9/1980 | Reed et al. .................. 431/348 |
| 4,347,052 A | | 8/1982 | Reed et al. |
| 4,348,168 A | * | 9/1982 | Coulon ........................... 431/9 |
| 4,351,632 A | | 9/1982 | Nagai |
| 4,357,134 A | * | 11/1982 | Katsushige et al. ............ 431/9 |
| 4,439,137 A | | 3/1984 | Suzuki et al. |
| 4,443,182 A | * | 4/1984 | Wojcieson et al. ......... 431/183 |
| 4,475,885 A | * | 10/1984 | Finke ........................ 431/182 |
| 4,741,279 A | * | 5/1988 | Azuhata et al. ............. 110/347 |
| 4,842,509 A | | 6/1989 | Hasenack |
| 4,911,637 A | | 3/1990 | Moore et al. |
| 4,945,841 A | | 8/1990 | Nakamachi et al. |
| 4,983,118 A | | 1/1991 | Hovis et al. |
| 5,240,410 A | * | 8/1993 | Yang et al. .................. 431/284 |
| 5,269,679 A | * | 12/1993 | Syska et al. .................... 431/9 |
| 5,433,600 A | * | 7/1995 | Jeng et al. .................. 431/183 |
| 5,658,141 A | * | 8/1997 | Larquet et al. ............. 431/187 |
| 5,743,723 A | | 4/1998 | Iatrides et al. |
| 5,797,738 A | | 8/1998 | Wills |
| 5,813,846 A | | 9/1998 | Newby et al. |
| 5,944,507 A | | 8/1999 | Feldermann |
| 6,471,508 B1 | | 10/2002 | Finke et al. |

FOREIGN PATENT DOCUMENTS

| | | | |
|---|---|---|---|
| DE | 41 30 922 A1 | | 3/1993 |
| EP | 0 040 526 A2 | | 11/1981 |
| EP | 0 498 378 A2 | | 8/1992 |
| EP | 0 736 732 A1 | | 10/1996 |
| EP | 0 774 620 | * | 5/1997 |
| EP | 0 774 620 A1 | | 5/1997 |
| EP | 0 877 202 A2 | | 11/1998 |
| GB | 2 094 464 | * | 9/1982 |
| JP | 52-32132 | * | 3/1952 |
| JP | 55-32132 | * | 3/1977 |
| JP | 52-140920 | * | 11/1977 |
| JP | 53-141931 | * | 12/1978 |
| JP | 53-141932 | * | 12/1978 |
| JP | 54-52339 | * | 4/1979 |
| JP | 54-54340 | * | 4/1979 |
| JP | 54-55825 | * | 5/1979 |
| JP | 55-60109 | * | 5/1980 |
| JP | 56-20908 | * | 2/1981 |
| JP | 559-145405 | * | 8/1984 |
| JP | 62-134410 | | 6/1987 |
| JP | 03-63401 | * | 3/1991 |
| JP | 404009511 | * | 1/1992 |
| JP | 6-193824 | | 7/1994 |
| JP | 07-318020 | * | 12/1995 |
| JP | 08-94253 | * | 4/1996 |
| JP | 8-128608 | | 5/1996 |
| JP | 08-178227 | * | 7/1996 |
| JP | 08-226619 | * | 9/1996 |
| JP | 09-133347 | * | 5/1997 |
| JP | 9-217904 | | 8/1997 |
| JP | 09-229315 | * | 9/1997 |
| JP | 10-89614 | | 4/1998 |
| JP | 10-176809 | | 6/1998 |
| JP | 10-176810 | | 6/1998 |
| WO | WO 96/09496 | | 3/1996 |

OTHER PUBLICATIONS

Osamu Takahashi et al., "Development of High Speed Jet Type Low Nox Gas Burner", Osaka, Japan (pp. 1-11).

* cited by examiner

| | NOx PPM @ 3% O2 | |
|---|---|---|
| | CONVENTIONAL COANDA BURNER | AIR-STAGED COANDA BURNER |
| 700°F AIR | 120 | 46 |
| AMBIENT AIR | 59 | 32 |

2400°F FURNACE TEMPERATURE
5% EXCESS AIR OPERATION
SAME CONFINEMENT OF FLAMES

AIR STAGED LOW-NOX BURNER

BACKGROUND OF THE INVENTION

1. Field of the Invention

The present invention relates to low-NOx burners, and, in particular, to air-staged low-NOx burners.

2. Description of the Prior Art

Oxides of nitrogen (NOx) are produced from the burning of fuels during the normal operation of a typical burner. These oxides combine with hydrocarbons in the atmosphere, creating "smog", which, when inhaled, may cause injury. Further, the U.S. Environmental Protection Agency, as well as state and local air pollution agencies, have passed certain environmental laws providing limitations and technological standards on the amount of NOx a facility may emit. These standards are continuing to become more and more stringent, creating a technological need for low-NOx burners.

Decreasing the NOx emissions from a burner is a well-known need. For example, U.S. Pat. No. 4,004,875 to Zink et al. (hereinafter "the Zink patent") discloses a low-NOx burner concept that introduces secondary air to the hot face of the burner in addition to the primary air. In the Zink patent, primary air is provided in an amount that is insufficient to completely combust the fuel. The secondary air is introduced in a second stage to complete the combustion process. Overall, the use of staged air in this manner leads to reduced NOx emissions from the burner unit. Likewise, U.S. Pat. No. 4,347,052 to Reed et al. discloses the use of primary, secondary and tertiary air in predetermined stoichiometric proportions in order to stage combustion and, thus, reduce the production of NOx from the burner. Finally, U.S. Pat. No. 4,983,118 to Hovis et al. describes the use of air staging to reduce the production of NOx from a regenerative burner. The introduction of secondary or tertiary air in all of these burner concepts demonstrates the well-known usage of incomplete combustion to retard the production of NOx from the burner. This retardation occurs due to the overabundance of carbon dioxide, water vapor and methane in the burner mix at the initial stage.

As the environmental laws tighten, there is still considerable room in the art for technology that further reduces the production of NOx from industrial burners. While the above-referenced patents, among others, use incomplete combustion to reduce NOx, improvements over this design concept are in need.

SUMMARY OF THE INVENTION

The present invention uses staged air combustion to reduce the production of NOx from a burner and includes a burner body adjacent a port block. The present invention also includes a fuel passageway connecting a fuel source to a burner throat. Primary air jets are connected to an air source and inject air into a primary combustion region. This primary combustion region is in the burner throat. The primary air jets can be configured such that air is introduced into the primary combustion region in a swirling manner. A dish surface is located in the port block; the dish surface extending in an angle divergent with respect to a centerline extending through the burner throat. Finally, the present invention utilizes secondary air jets connected to an air source. These secondary air jets extend through the port block and inject secondary air into a secondary combustion region located downstream from the primary combustion region.

The present invention also includes a method of reducing NOx emissions from a burner, wherein fuel is taken from a fuel source and injected into a burner throat via a fuel passageway, and primary air is injected from an air source into a primary combustion region in the burner throat. Further, this primary combustion is conducted in a fuel-rich highly vitiated environment which consumes available oxygen, limiting flame temperature and thermal NOx. Fuel is fed into the burner and proceeds to the throat where the primary air and fuel mix together to form the initial stage of combustion. A combustion reaction is initiated in the burner throat. The preferable convergent, angled introduction of the air through the primary air jets creates a swirling cyclone pattern that hugs the walls of the port block and pulls and mixes the fuel and recirculated products of combustion into the cyclone. After the primary combustion step, the air/fuel mixture then enters a secondary combustion region. Air is introduced into the secondary combustion region so as to allow the combustion process to complete. Products of combustion are drawn into a vortex created by the swirling mixture of fuel and air during the combustion process. The overall NOx production is thereby reduced.

DETAILED DESCRIPTION OF THE PREFERRED EMBODIMENTS

Figure 1:
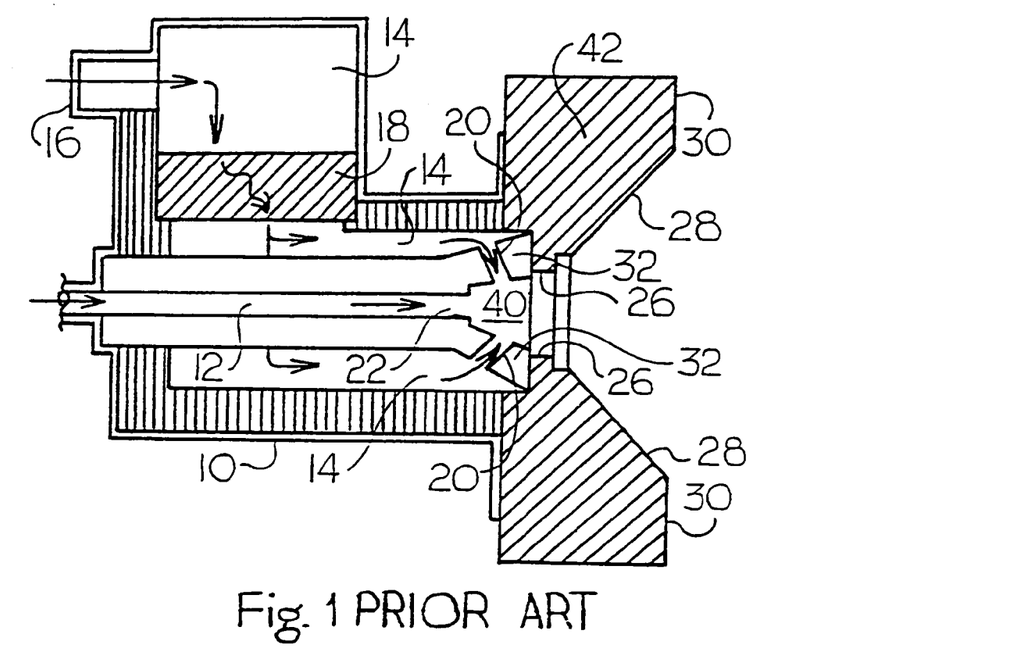
FIG. 1 is a side view of a single stage burner design according to the prior art.

As seen in FIG. 1, the design of a typical prior art burner includes a burner body 10, which houses an air passageway 14 and a fuel passageway 12. The air passageway 14 may have an optional heat storing media 18 area, depending upon the application. Fuel is introduced into the fuel passageway 12, which directs the fuel through the burner body 10, and flows out through a fuel nozzle 22. All required combustion air enters through an air entrance 16, runs through the air passageway 14 and enters a combustion region through primary air jets 20. The burner body 10 is fixed to a port block 42. The fuel and air initially mix in a burner throat 40 of the burner. Combustion occurs in the burner throat 40 and continues into cup 26 and from these to a space surrounded by a dish surface 28.

Figure 2:
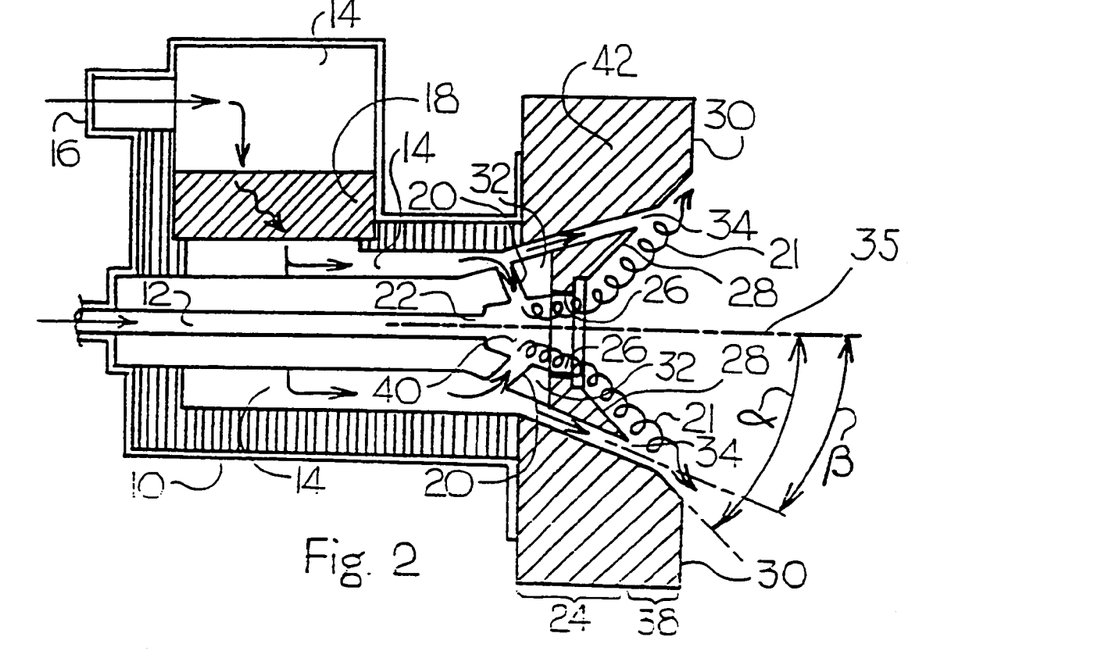
FIG. 2 is a side view of a first embodiment according to the present invention.

The present invention is an apparatus and method directed to an air-staged low-NOx burner. The first embodiment is illustrated in FIG. 2. A liquid or gaseous fuel is introduced into the burner body 10 through the fuel passageway 12 where it proceeds through the fuel nozzle 22 into the burner throat 40 in a primary combustion stage 24. The air enters through the air entrance 16 where it may or may not pass through the heat storing media 18. The air flows through the air passageway 14 and is split into primary air (i.e., the first air to be introduced to the fuel), which exits through the primary air jets 20, and secondary air, which exits through secondary air jets 34.

Figure 9:
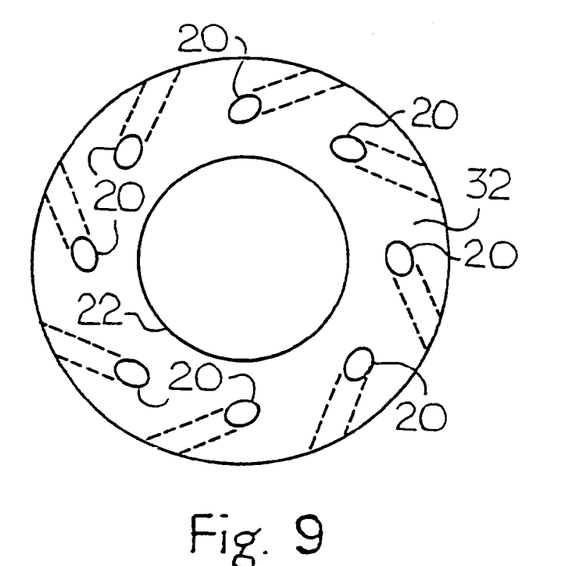
FIG. 9 is a front view of the present invention illustrating a swirling primary air jet configuration.

Due to the jet action and an angular orientation of the primary air jets 20, the air enters the throat 40 in a swirling manner, illustrated as line 21 in FIG. 2. This swirling pattern is created by tangential forces and causes the swirling air to travel along the dish surface 28 of the port block 42. This swirling and sticking phenomena (line 21) is called the "Coanda effect", which also creates a negative vortex within the center of the air swirl. This negative vortex pulls the fuel stream and recirculated products of completed combustion into the swirling air 21, mixing the components together. A preferable angular orientation of the primary air jets 20 is illustrated in FIG. 9.

The combustion process is initiated by spark, pilot flame or another suitable method. Upon ignition, combustion occurs in the primary combustion region 24. However, the fuel to primary air ratio is adjusted to ensure this combustion occurs under a highly vitiated fuel-rich condition. The fuel-rich condition allows the combustion process to consume all available oxygen, disallowing complete combustion and preventing creation of excess thermal NOx. Combustion under fuel-rich conditions, coupled with the recirculated products of combustion pulled through the vortex, limits flame temperature and reduces the amount of thermal NOx produced. Further, the "Coanda effect" causes the combusted mixture to continue along the surface of the burner throat 40, the cup 26, and along the dish surface 28. This also provides a uniform temperature and rotating flame within the port block 42. The dish surface 28 extends in a divergent manner with respect to a centerline 35 running through the longitudinal axis of the burner throat 40. Specifically, in the case of a planar or flat dish surface 28, this angle of divergence α between the dish surface 28 and centerline 35 may be between about 25° and 89° (i.e., ±5° on either end of the range) with the preferred angle α between about 25° and about 50° (i.e., ±5°).

Figure 12:
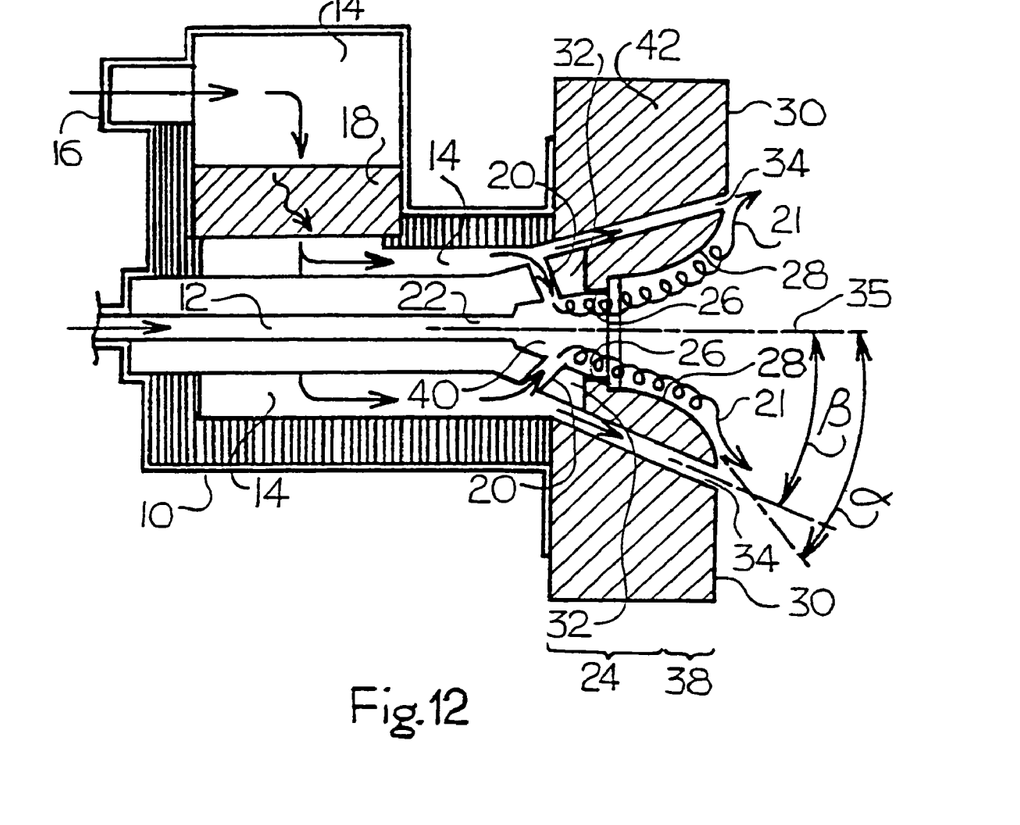
FIG. 12 is a side view of a further embodiment according to the present invention.

It is also envisioned that the dish surface 28 may have a continuously shifting angle of divergence α, resulting in a trumpet-like shape to the dish surface 28. As shown in FIG. 12, the angle of divergence α, measured between the centerline 35 and a line tangential to the rounded, bell-shaped dish surface 28, is continuously shifting. The trumpet-like shaped dish surface 28 of FIG. 12 still allows for the required Coanda effect, with enhancement of the Coanda effect by the secondary air jets 34.

Figure 3:
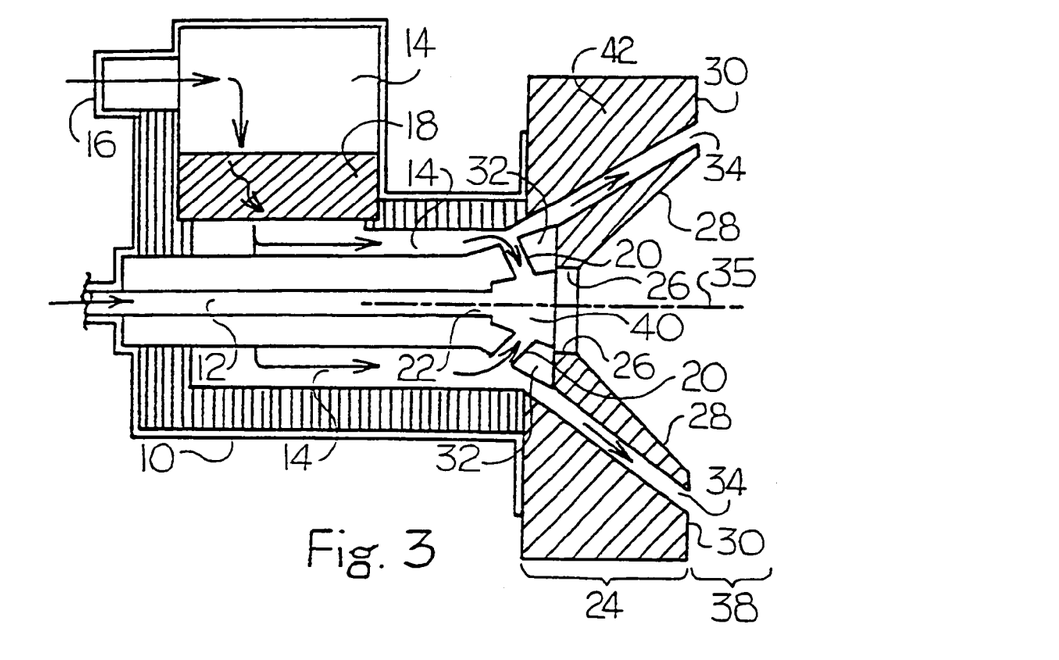
FIG. 3 is a side view of a second embodiment according to the present invention.

As the combusted mixture rides out of the cup 26 and into the dish surface 28, the negative vortex continues to pull the products of combustion through the mixture from a furnace atmosphere into which the burner is firing. This mixture then encounters the secondary air jets 34, which open into the dish surface 28. In a preferred embodiment, these secondary air jets 34 are oriented in a divergent manner. As illustrated in FIGS. 2 and 3, the secondary air jets 34 are divergent with respect to the centerline 35 running through the longitudinal axis of the burner throat 40. The angle of divergence β between the secondary air jets 34 and centerline 35 may be between 1° and 89°, however the optimal range is between about 15° and about 50° (i.e., ±5°). Larger angles could be beneficial to flame shape, but become difficult from a construction standpoint. It is envisioned that the burner throat 40, as well as the fuel passageway 12 extend perpendicularly to the port block 42 in a normal burner configuration. The divergent orientation of the secondary air jets 34 encourages the same "Coanda effect", further maintaining the negative vortex. Again, this negative vortex continues to pull the air/fuel/products of combustion together into a homogenous mixture. This homogenous mixture, created by the use of the secondary air jets 34, controls the combustion process and limits the flame temperature, thereby limiting the amount of thermal NOx produced in a secondary combustion region 38.

Figure 11:
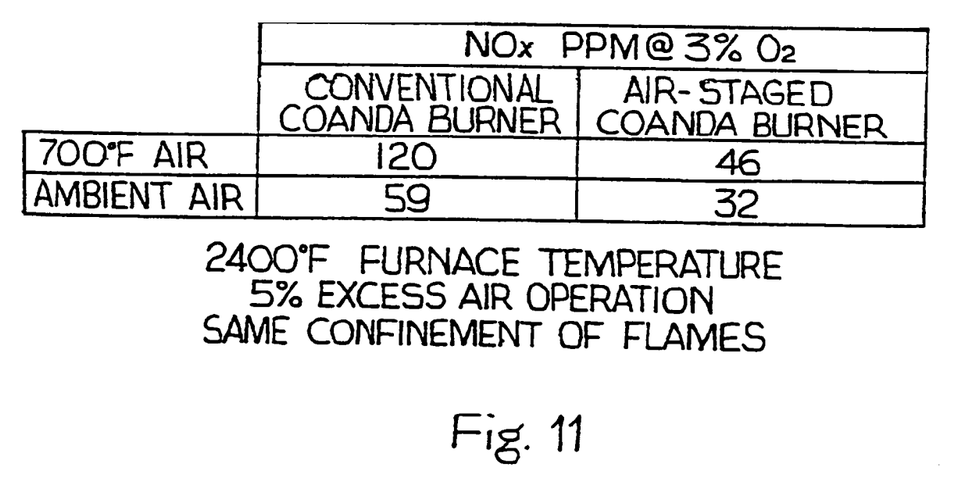
FIG. 11 is a table illustrating the NOx emissions of the present invention versus conventional Coanda burners.

The primary air jets 20 and the secondary air jets 34 are controlled as to both velocity and air split ratio. Both of these characteristics control the flame geometry, combustion pattern and the amount of emissions emitted from the burner. Specifically, it is envisioned that the air split ratio be within the limits of 40/60 (primary air/secondary air) to 75/25 (primary air/secondary air). As shown in FIG. 11, using a 58% primary air/42% secondary air split ratio together with the above described invention, the burner NOx emissions are significantly reduced. However, this air split ratio can vary according to the use of ambient air and other variable factors.

Another embodiment of the present invention is illustrated in FIG. 3. This embodiment operates in substantially the same manner as the first embodiment described above. However, as opposed to the secondary air jets 34 entering the dish surface 28 in a divergent orientation, the secondary air jets 34 open at a hot face 30 in a divergent orientation. In this embodiment, the secondary combustion zone 38 is moved further into the furnace. The swirling pattern and negative vortex are created due to the angular entry of primary air. The flame geometry and overall combustion process are altered in the new orientation. The mixing of the secondary air with uncombusted partially-reacted fuel is further delayed (relative to FIG. 2), yielding further NOx reduction and increased flame diameter.

Figure 4:
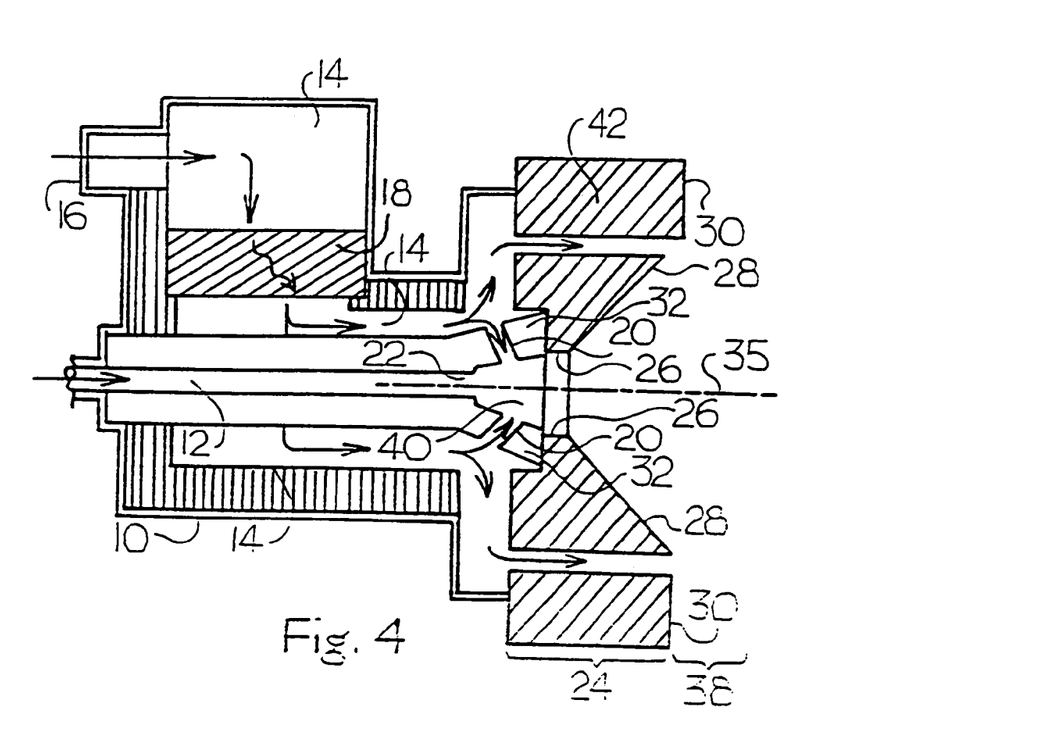
FIG. 4 is a side view of a third embodiment according to the present invention.

The third embodiment of the present invention is illustrated in FIG. 4. This embodiment operates in substantially the same manner as the first embodiment described above. However, as opposed to the secondary air jets 34 entering the dish surface 28 in a divergent orientation, the secondary air jets 34 enter the hot face 30 in an orientation parallel to the centerline 35 extending through the longitudinal axis of the burner throat 40. The flame geometry and overall combustion process are altered in the new orientation. The flame will be more stable and produce only slightly higher NOx (relative to the first and second embodiments).

Figure 8:
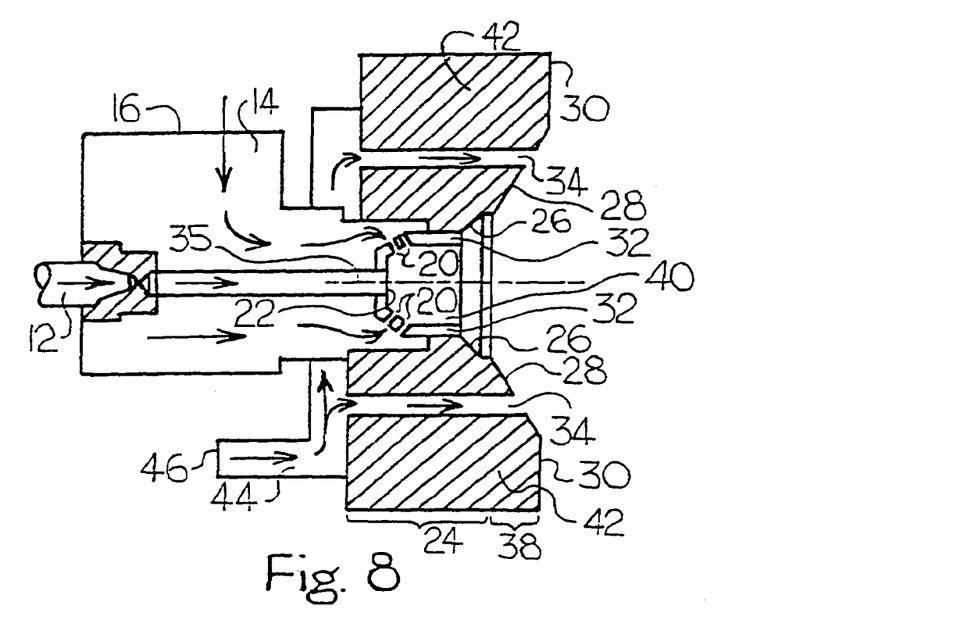
FIG. 8 is a side view of the present invention illustrating the use of multiple air supplies as applied to a non-regenerative burner.

While the current air supply of primary and secondary air is described as emanating from a common air source, it is also anticipated that a second air source can be used to supply the secondary air jets 34. For example, the air may be supplied through direct connections to passageways in the port block 42. Using alternate air supplies allow further control of the flame geometry and combustion characteristics through stoichiometric variation. As seen in FIG. 8, with application to a non-regenerative burner configuration, the secondary air jets 34 can be supplied through a different air source. For example, a secondary air inlet 46 can be utilized, allowing secondary air to flow through a secondary air passageway 44 into the secondary air jets 34. This would allow the use of air with different qualitative and quantitative variations than the primary air, yielding further control over the process. Still further, each of the secondary air jets 34 may have identical or different air sources from each other, allowing even greater control of the process.

Figure 5:
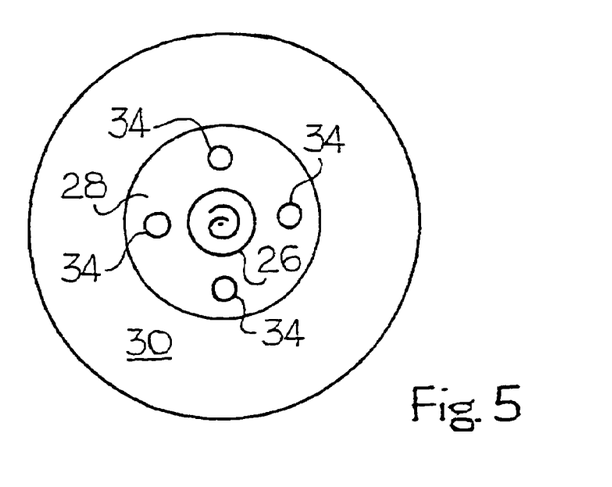
FIG. 5 is a front view of the present invention illustrating a secondary air jet hole configuration in a dish surface on a burner.
Figure 6:
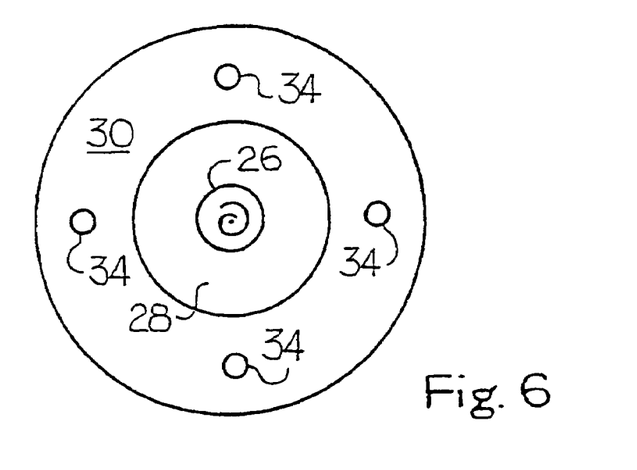
FIG. 6 is a front view of the present invention illustrating a further secondary air jet configuration in a hot face of the burner.
Figure 7:
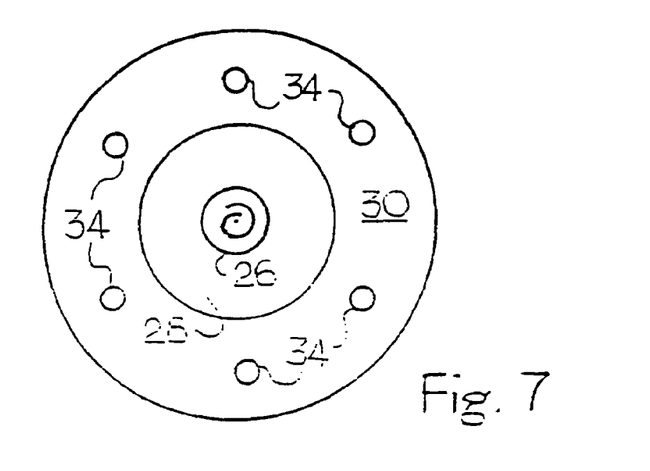
FIG. 7 is a front view of the present invention illustrating a still further secondary air jet configuration in a hot face of the burner.

In another variation, the number and location of secondary air jets 34 may be changed, affecting the flame geometry and combustion process. FIG. 5 shows a first secondary air jet configuration, using four secondary air jets 34 equally spaced around the dish surface 28. FIG. 6 shows a second secondary air jet configuration, using four secondary air jets 34 equally spaced around the hot face 30. FIG. 7 shows a third secondary air jet configuration, using six secondary air jets 34 equally spaced around the hot face 30. It will be apparent to those skilled in the art that the number of secondary air jets 34 used, and their relative location, can vary. The preferred arrangement is with equally spaced secondary air jets 34, however, non-uniformly spaced jets will function with minor change in NOx emissions.

Figure 10:
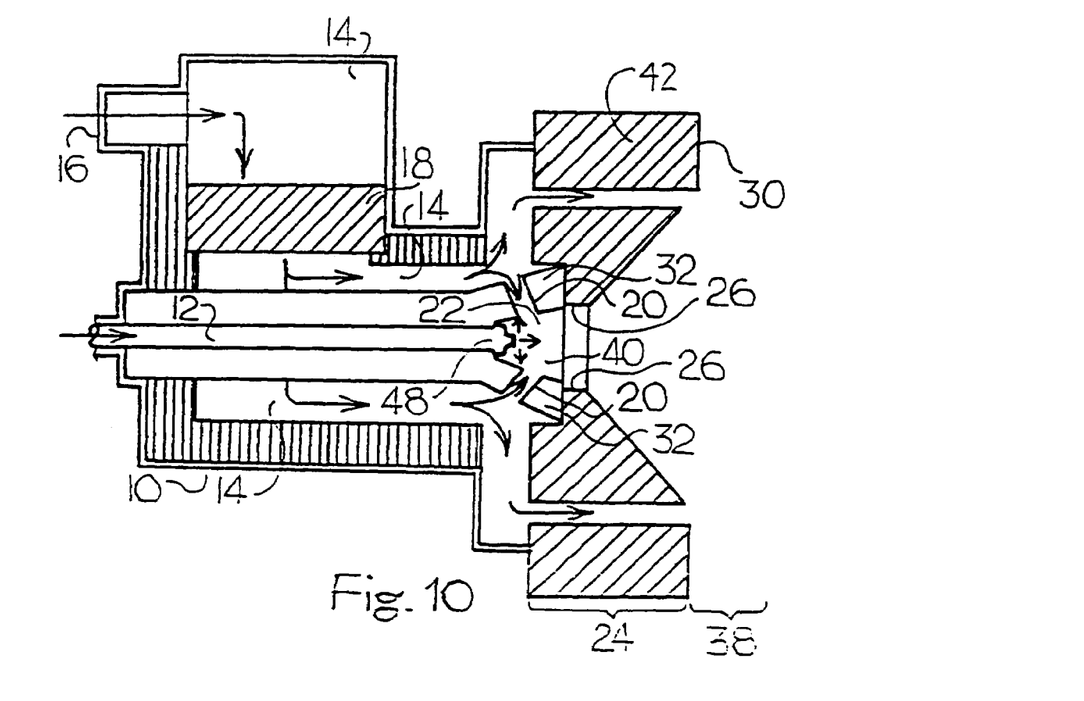
FIG. 10 is a side view of the present invention illustrating a two direction gas nozzle configuration.

Another arrangement for adjusting flame stability is seen in FIG. 10. Specifically, using a two-direction fuel nozzle 48 more evenly distributes the fuel into the fuel/primary air mixture. This optional addition would create an even more homogenous mixture of fuel and air.

It will be evident to those of ordinary skill in the art that various changes and modifications may be made to the present invention without departing from the spirit and scope thereof. For example, the swirling effect in the burner throat 40 could be accomplished by swirling the fuel, instead of swirling the primary combustion air, as described above. It is therefore intended that the invention be limited only by the attached claims, and equivalents thereof.

We claim:

1. A method of reducing NOx emissions from a burner comprising the steps of:
    (a) injecting fuel from a fuel source into a burner throat via a fuel passageway;
    (b) injecting primary air from an ambient air source through a single connection into a primary combustion region located in the burner throat, the ratio of fuel to primary air being such as to create a fuel rich mixture of fuel and primary air;
    (c) inducing a swirling effect upon the mixture of fuel and primary air in the burner throat;
    (d) combusting the mixture of fuel and primary air;
    (e) passing the swirling mixture of fuel and primary air to a port block wherein, due to Coanda effect, at least part of the mixture of fuel and primary air remains adjacent a dish surface in the port block;
    (f) injecting secondary air from the same ambient air source as said primary air and through said single connection into a secondary combustion region located downstream from the primary combustion region in an amount at least sufficient to complete the combustion of the fuel;
    wherein the secondary air is injected through at least one secondary air jet diverging with respect to a centerline extending through the burner throat and wherein the air split ratio of primary air to secondary air is within the range 40/60 to 75/25;
    and further wherein an angle of divergence of the at least one secondary air jet is from about 15° to about 50°, and is less than an angle of divergence of said dish surface;
    (g) drawing products of combustion into a vortex created by the swirling mixture of fuel and air during the combustion process, thereby reducing NOx produced in the combustion process.

2. The method of claim 1, wherein the swirling effect in the burner throat is induced by configuration of at least one primary air jet.

3. The method of claim 2, wherein the secondary air is injected to the dish surface.

4. The method of claim 1, further comprising the step of passing the primary and secondary air through a heat storing media.

5. The method of claim 1, wherein the secondary air is injected to a burner hot face on the port block.

6. The method of claim 1, wherein the fuel is injected through a fuel nozzle on an end of the fuel passageway.

7. The method of claim 6, wherein the fuel nozzle is configured to inject the fuel in more than one direction.

8. The method of claim 6, wherein the fuel is caused to swirl in the burner throat via the fuel nozzle.

* * * * *